United States Patent
Takinami

(10) Patent No.: US 6,601,415 B2
(45) Date of Patent: Aug. 5, 2003

(54) DISK CONTAINER PROVIDED WITH ANTITHEFT FUNCTION AND UNLOCKING TOOL

(75) Inventor: Masashi Takinami, Fukui (JP)

(73) Assignee: Just Corporation Co., Ltd., Fukui-ken (JP)

(*) Notice: Subject to any disclaimer, the term of this patent is extended or adjusted under 35 U.S.C. 154(b) by 0 days.

(21) Appl. No.: 10/202,877

(22) Filed: Jul. 26, 2002

(65) Prior Publication Data

US 2003/0094021 A1 May 22, 2003

(30) Foreign Application Priority Data

Nov. 16, 2001 (JP) ........................................ 2001-351048

(51) Int. Cl.[7] .............................................. E05B 73/00
(52) U.S. Cl. ............................. 70/57.1; 70/63; 206/1.5; 206/308.2; 206/387.11
(58) Field of Search ........................... 70/276, 57.1, 58, 70/63; 206/1.5, 308.2, 387.11; 292/251.5

(56) References Cited

U.S. PATENT DOCUMENTS

| | | | | |
|---|---|---|---|---|
| 5,375,712 A | * | 12/1994 | Weisburn | 206/1.5 X |
| 5,468,031 A | * | 11/1995 | Holmgren | 70/63 X |
| 5,588,315 A | * | 12/1996 | Holmgren | 70/63 X |
| 5,850,752 A | * | 12/1998 | Lax | 70/276 |
| 5,882,052 A | * | 3/1999 | Whitehead | 292/80 |
| 5,988,376 A | * | 11/1999 | Lax | 206/308.2 |
| 6,082,156 A | * | 7/2000 | Bin | 70/57.1 |
| 6,155,087 A | * | 12/2000 | Necchi | 70/57.1 |
| 6,374,648 B1 | * | 4/2002 | Mitsuyama | 70/57.1 |
| 6,422,387 B1 | * | 7/2002 | Sedon et al. | 206/387.11 |
| 2002/0000111 A1 | * | 1/2002 | Belden, Jr. et al. | 70/57.1 |
| 2002/0003095 A1 | * | 1/2002 | Jaeb et al. | 206/308.2 |
| 2002/0011426 A1 | * | 1/2002 | Byrne et al. | 206/387.11 |
| 2002/0185397 A1 | * | 12/2002 | Sedon et al. | 206/387.11 |
| 2002/0194888 A1 | * | 12/2002 | Mitsuyama | 70/57.1 |

FOREIGN PATENT DOCUMENTS

| | | | | |
|---|---|---|---|---|
| GB | 18859 | * | 9/1899 | 70/276 |
| JP | 11-193086 | | 7/1999 | |
| WO | WO93/15294 | * | 8/1993 | 70/58 |

* cited by examiner

*Primary Examiner*—Lloyd A. Gall
(74) *Attorney, Agent, or Firm*—Wenderoth, Lind & Ponack, L.L.P.

(57) ABSTRACT

Disclosed is an antitheft type of disk container and an associated unlocking tool. The disk container comprises a container body having a disk space and a locking space defined therein, a cover plate hinged to the container body to open and close the disk and locking spaces, and a lock plate to be inserted in the locking space. The unlocking tool has a magnet installed therein. The container body and cover plate are provided with engagement portions in the form of projection or recess, and the lock plate is provided with counter engagement portions in the form of recess or projection, thereby preventing the cover plate from opening by making the engagement portions of the container body and cover plate engage with the counter engagement portions of the lock plate when the cover plate closes the container body with the lock plate inserted in the locking space. One of the lock plate and the container body is provided with a stopper to prevent the lock plate from falling off from the container body, and the other is provided with a catch hole to catch the stopper. The stopper is composed of a flat spring whose top end has a lock nail to be caught by the catch hole, thereby assuring that the disk container be prevented from opening inadvertently by allowing the stopper to fall off from the container body. The lock nail is responsive to application of the magnetic force of the unlocking tool to be pulled apart and released from the catch hole.

7 Claims, 7 Drawing Sheets

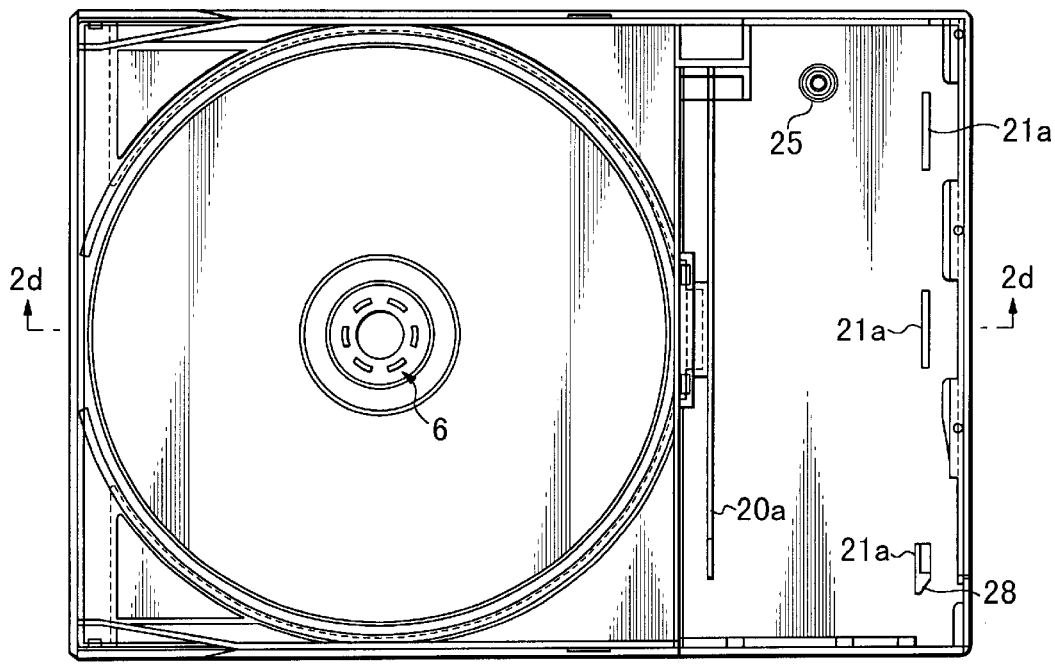
Fig. 2(a)
Fig. 2(b)
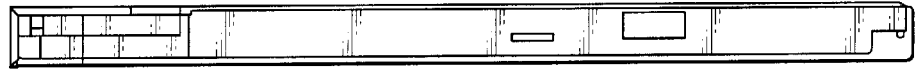
Fig. 2(c)
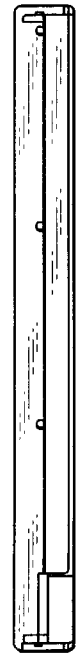
Fig. 2(d)
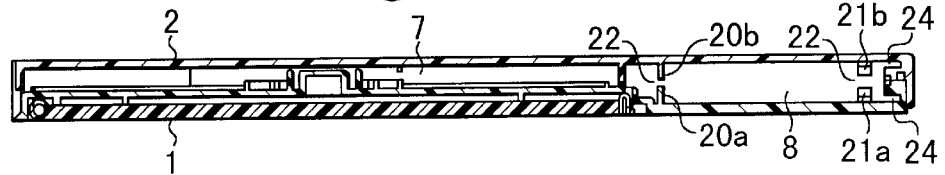
Fig. 2(e)
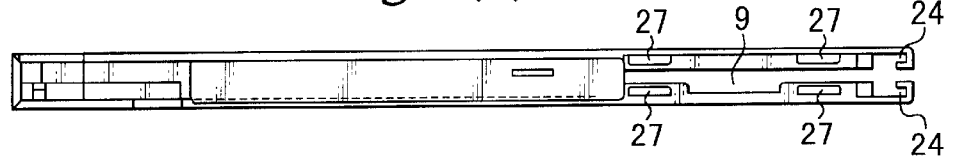

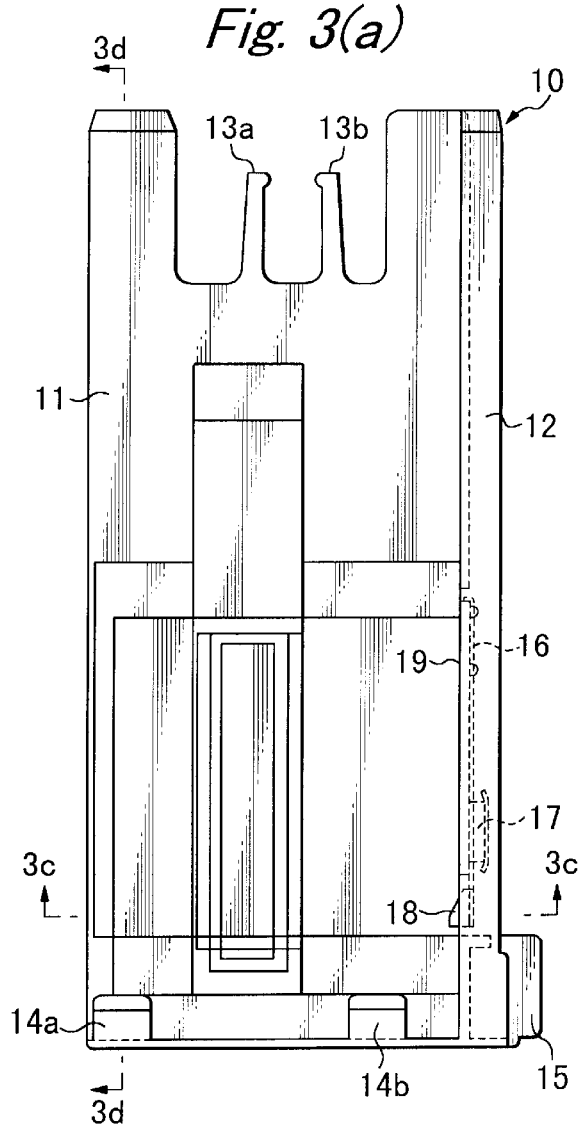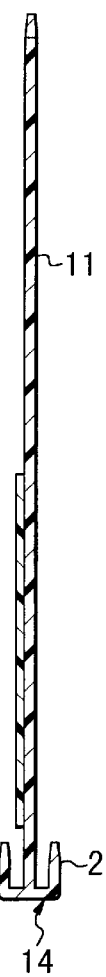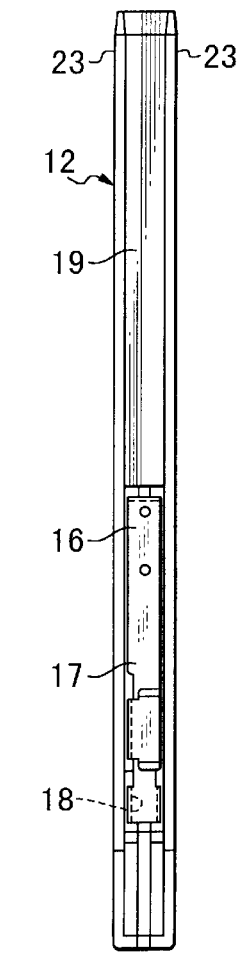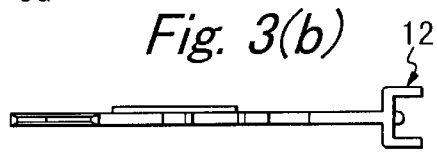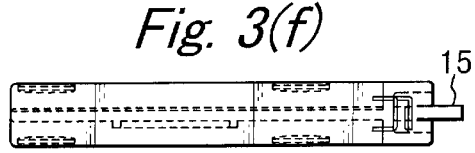

Fig. 6(a)
Fig. 6(c)
Fig. 6(b)
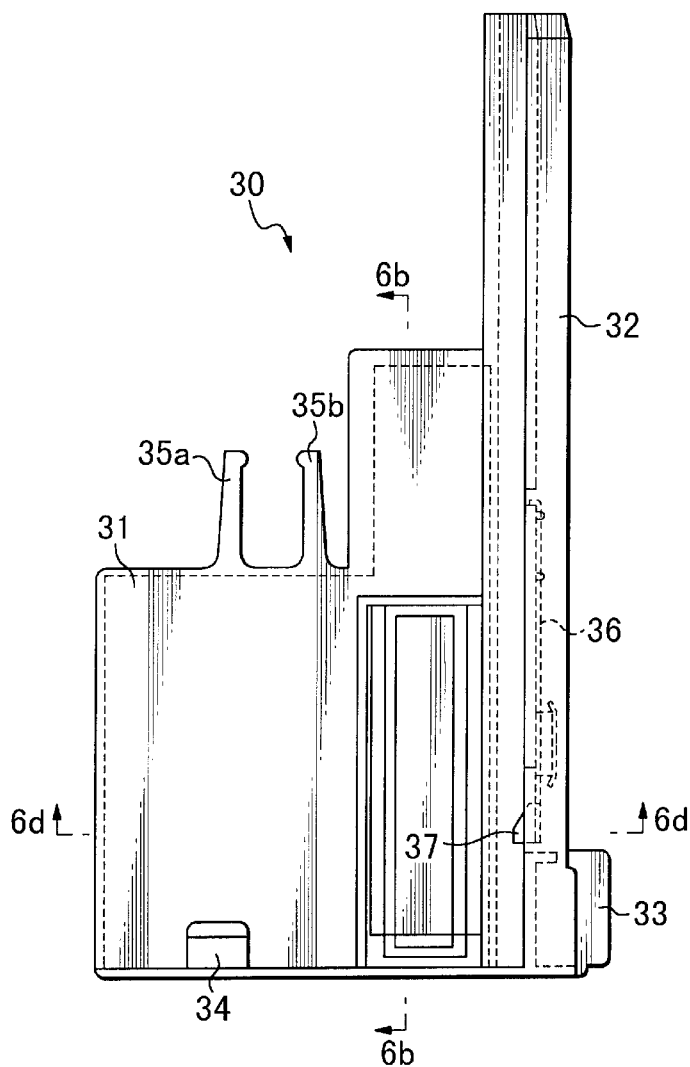
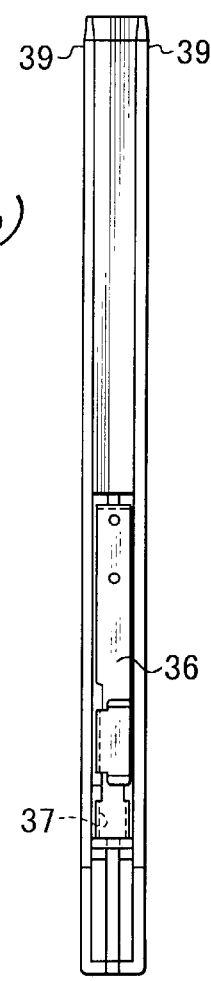
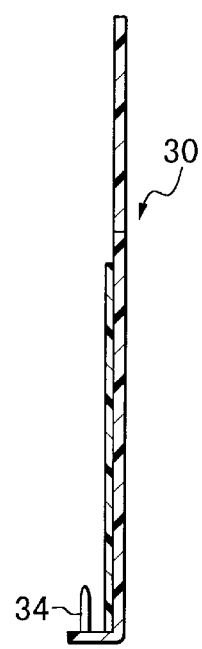
Fig. 6(d)
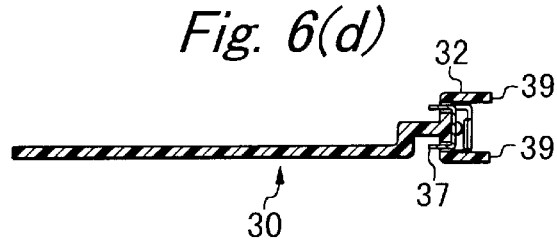

DISK CONTAINER PROVIDED WITH ANTITHEFT FUNCTION AND UNLOCKING TOOL

BACKGROUND OF THE INVENTION

1. Field of the Invention

The present invention relates to a disk container provided with an antitheft function to prevent DVDs, CDs or game software articles from being stolen in a disk rental or selling shop.

2. Related Arts

Assuming that DVDs and other disk articles are contained in ordinary disk cases, and that they are shelved for sale, there is a fear of such goods being stolen. In the hope of preventing such theft, the ordinary disk cases have antitheft tag seals applied to their front or rear sides. The antitheft gates in a shop are responsive to such antitheft tag seals for making a warning sound. Antitheft gates, however, are insensitive to the disk cases from which their tag seals are removed.

In many cases DVDs and other disk articles are contained in ordinary disk cases, and the "contained in cases" or cased goods are put in extra containers for display use in a shop. Such extra containers are locked and shelved in the shop. Customers select and bring some double cased goods to the counter in the shop, where clerks unlock the extra containers to take the cased goods out of the extra containers for passing them to the customers in exchange for money. Unlocking, however, is a somewhat troublesome work, which will be multiplied when unlocking a plurality of extra containers. A pretty long time involved for unlocking causes customers to be irritated.

One example of such lock container is a "compact disk case provided with antitheft function" as shown in Japan Patent 11-193086(A). A cased disk is put in such a lock case for display use. It takes a pretty long time for a clerk to unlock the double cased article and take the cased disk out of the unlocked outer lock case. The lock case of the Japan Patent 11-193086(A) comprises a flat box-like base, an expandable U-shaped frame and two locking-and-unlocking assemblies for locking the U-shaped frame to the box-like base in its rearward shrinking position or for unlocking the U-shaped; frame in its forward expanding position.

Each locking-and-unlocking assembly comprises a resilient piece having forward and rearward projections series-arranged on one side, which resilient piece is fixed to either arm of the U-shaped frame. The flat, box-like base has catch recesses made on its opposite sidewalls. When the box-like base and the U-shaped frame are connected with the forward projections of the resilient pieces caught by the catch recesses of the box-like base, the base-and-frame combination is put in its rearward shrinking position, in which the space defined by the base-and-frame combination is large enough to accommodate the cased disk. When the box-like base and the U-shaped frame are connected with the rearward projections caught by the catch recesses, the base-and-frame combination is put in its forward expanding position, in which the space defined by the base-and-frame combination is larger than the cased disk, thus permitting the cased disk to be taken out.

Before the U-shaped frame is pulled away from the box-like base, thereby shifting from the rearward shrinking position to the forward expanding position, the resilient pieces need to be so bent that their forward projections may leave the catch recesses. For the purpose a magnet is used to pull and bend each resilient piece apart from the side wall of the box-like base until its forward projection has left the catch recess, and then the U-shaped frame is pulled away from the base until the rearward projection has been caught by the catch recess. Thus, the cased disk can be taken out from the lock outer case.

It is, however, required that the U-shaped frame be pulled away from the base while keeping the U-shaped frame unlatched by applying the magnetic force to each resilient piece. This bothers one in taking the cased disk out of the lock outer case: Such bothering work rust be repeated for each and every double cased disk. Assuming that one customer wants to buy or rent a plurality of DVDs and other disk articles, or one clerk keep the plural customers waiting, the bothering work will be multiplied accordingly. It is, therefore, required that a plurality of lock cases be unlocked and opened simultaneously.

SUMMARY OF THE INVENTION

In view of the above one object of the present invention is to provide a disk container provided with an antitheft function and an associated unlocking tool, which disk container can be locked and unlocked easily, a plurality of such disk containers being able to be unlocked simultaneously.

To attain this object, a disk container provided with an antitheft function and an associated unlocking tool are improved according to the present invention in that: said disk container comprising a container body having a disk space defined therein, a cover plate hinged to said container body to open and close the disk space of said container body, and a lock plate; said unlocking tool having a magnet installed therein; said container body and said cover plate being so constructed that said container body may define a locking space to accommodate said lock plate when said container body is covered by said cover plate, and said container body having a slot made on one side to communicate with said locking space; said container body and said cover plate being provided with engagement portions in the form of projection or recess, and said lock plate being provided with counter engagement portions in the form of recess or projection, thereby preventing said cover plate from opening by making said engagement portions of said container body and cover plate engage with said counter engagement portions of said lock plate when said cover plate closes said container body with said lock plate inserted in said locking space; one of said lock plate and said container body being provided with a stopper to prevent said lock plate from falling off, and the other being provided with a catch to catch said stopper; said stopper being composed of a flat spring whose top end has a lock nail to be caught by said catch, thereby assuring that said disk container be prevented from opening inadvertently by inserting said lock plate in said locking space until said lock nail of said flat spring is caught by said catch, said lock nail being responsive to application of the magnetic force of said unlocking tool to be pulled apart and released from said catch.

With this arrangement insertion of the lock plate in the locking space prevents the cover plate from opening by mating the engagement portions of the container body and cover plate with the counter engagement portions of the lock plate, and at the same time, the lock plate from falling off by making the lock nail of the stopper to be caught by the catch. The flat spring is responsive to the magnetic force for bending a predetermined angle large enough to allow the lock nail to leave the catch, thus unlatching the lock plate.

Then, the lock plate can be pulled out of the disk container, so that the disk container may be unlocked, and the unlocked disk container containing a disk therein may be passed to the customer in exchange for money. The unlocking work is easy, and a plurality of disk containers can be unlocked simultaneously.

The cover plate may be of detachable, openable, slidable, rotary or drawer type. No matter of what opening type the cover plate may be, the locking mechanism can be used.

The cover plate may have an extra space formed on its front side for containing pieces of printed matter such as a chapter sheet, an advertising leaflet, or a librettos leaflet, and other leaflets, the cover plate being provided with a sub-cover plate to close the extra space.

With this arrangement the sub-cover plate can be opened to take out the pieces of printed matter while the cover plate remains locked.

The lock plate may have a flat space to attach a tag seal thereto. With this arrangement the attached tag seal cannot be scratched or removed, and therefore, the antitheft function cannot be lost.

The lock plate may have a projection piece integrally connected thereto, the projection piece appearing out of the disk container when the lock plate is inserted in the container body, the unlocking tool having its magnet such a distance apart from a selected corner of the unlocking tool that when the disk container is applied to the unlocking tool with the projection caught by the selected corner, the magnet may be aligned with the lock nail to release the lock nail from the catch, thus permitting a plurality of disk containers to be simultaneously unlocked simply by applying them to the unlocking tool with their projections caught by the selected corner. In this position the disk containers are moved on the unlocking tool to leave the lock plates behind, and then, the unlocked, cased goods can be passed to customers.

Other objects and advantages of the present invention will be understood from the following description of preferred embodiments of the present invention, which are illustrated in accompanying drawings.

BRIEF DESCRIPTION OF THE DRAWING

FIGS. 3(a), (b), (c), (d), (e) and (f) are a plane view, rear view, sectional view taken along the line 3c—3c in FIG. 3(a),: sectional view taken along the line 3d—3d in FIG. 3(a), right side view and front view of the lock plate respectively;

FIGS. 6(a), (b), (c) and (d) are plane view, sectional view taken along the line 6b—6b in FIG. 6(a), right side view and sectional view taken along the line 6d—6d in FIG. 6(a) of the lock plate respectively.

DETAILED DESCRIPTION OF PREFERRED EMBODIMENT

Figure 1:
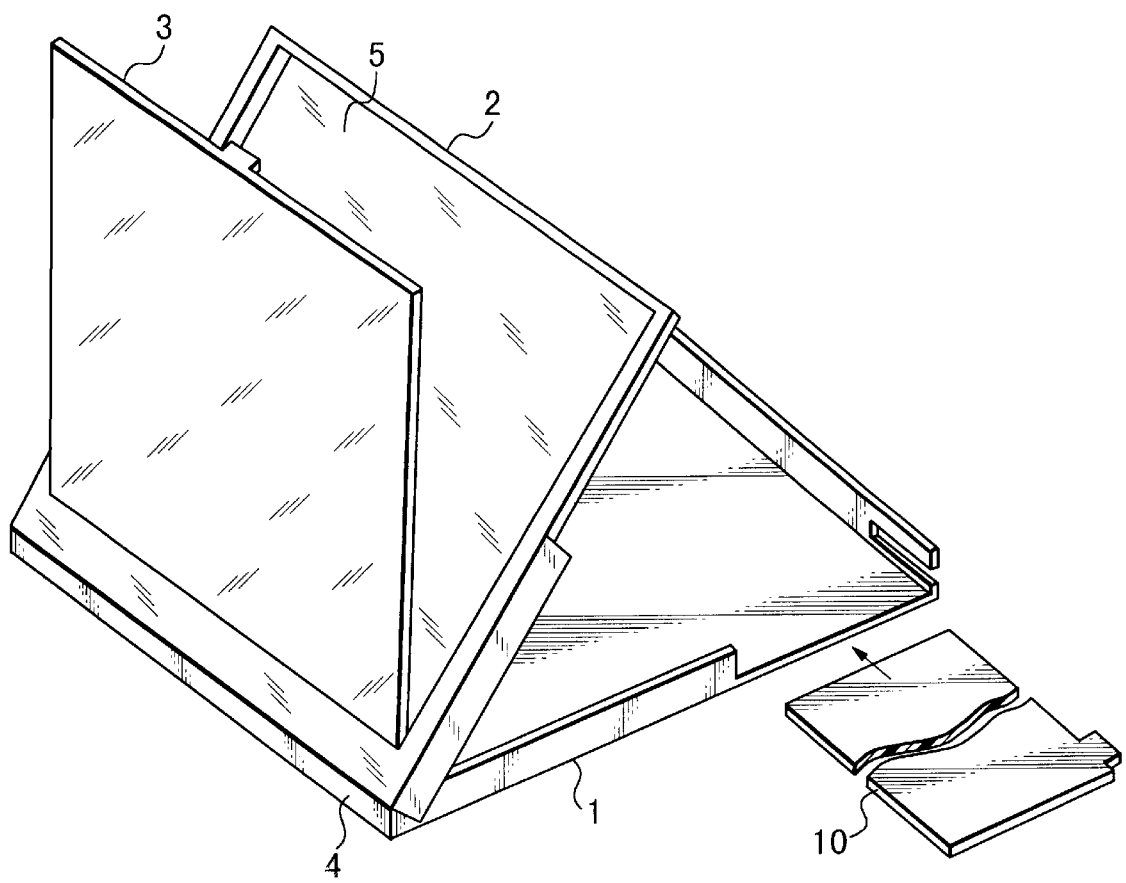
FIG. 1 is a perspective view of a disk container according to one preferred embodiment of the present invention, FIGS. 2(a), (b), (c), (d) and (e) are a plane view, rear view, right side view, sectional view taken along the line 2d—2d in FIG. 2(a) and front view of the disk container respectively.
Figure 4A:
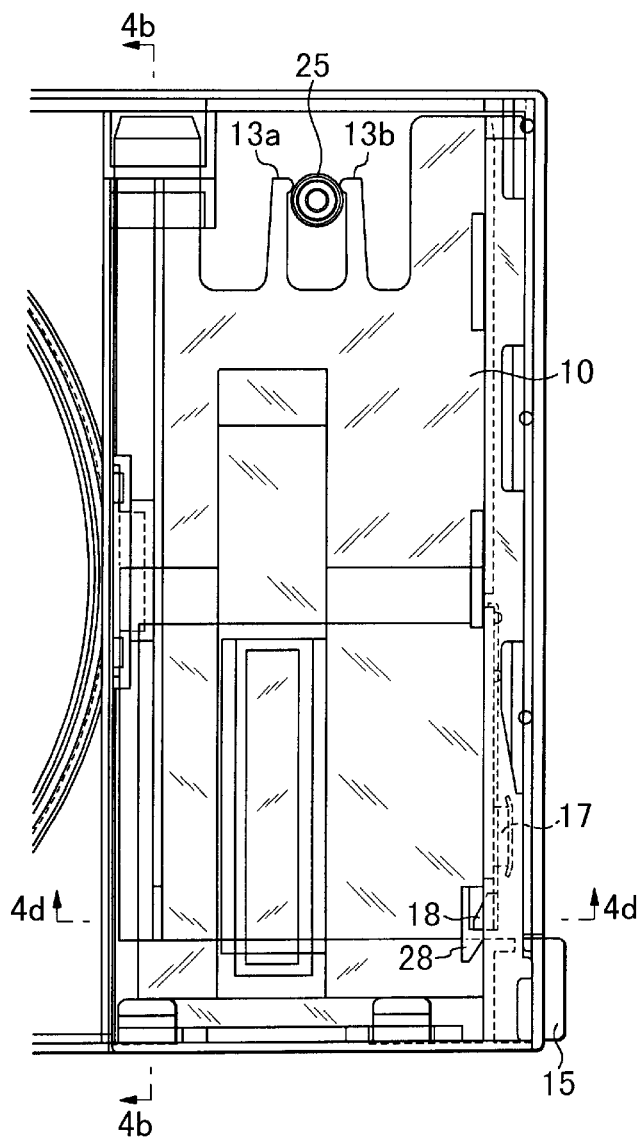
FIGS. 4(a), (b), (c) and (d) are a cross section, longitudinal section, right side view of the disk container having its lock plate inserted therein, and sectional view taken along the line 4d—4d in FIG. 4(a), respectively.
Figure 4B:
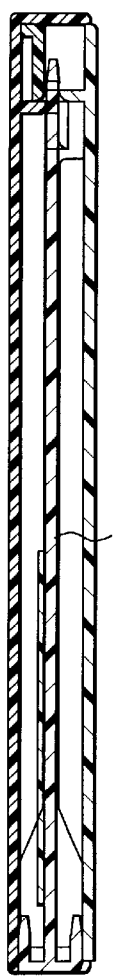
Figure 4C:
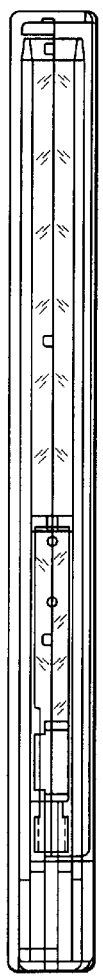
Figure 4D:
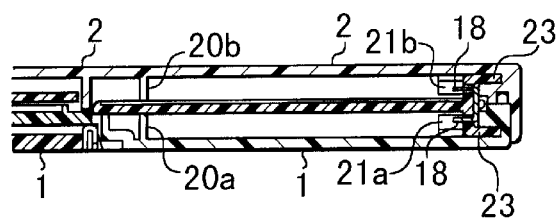

FIG. 1 shows a disk container provided with an antitheft function according to one preferred embodiment of the present invention, which disk container is used in containing a DVD for sale or rent. It comprises a container body 1, a cover plate 2 and a sub-cover plate 3. The container body 1 has a disk space defined therein, and the cover plate 2 is hinged to one lateral edge of the container body 1 to open and close the disk space of the container body 1. The cover plate 2 has an extra space 5 defined therein, and the sub-cover plate 3 is hinged to one lateral edge of the cover plate 2 to open and close the extra space of the cover plate 2.

The container body 1 contains a DVD or any other disk in its disk space whereas the cover plate 2 contains pieces of printed matter in its extra space. Examples of such printed matter are chapter sheets, advertising leaflets, librettos et al. The cover plate 2 can be folded to close the disk space containing the DVD. Likewise, the sub-cover plate 3 is folded to close the extra space containing the printed matter. Then, the disk container is put on the shelf for display in a shop.

FIGS. 2(a) to 2(e) show the inner structure of the disk container as viewed from different angles of view. Specifically FIG. 2(a) shows the inner structure of the disk container with its cover plate 2 opened; FIG. 2(b) shows the rear side of the disk container; FIG. 2(c) shows the right side of the disk container; FIG. 2(d) shows how the disk container looks if it were cut along the line 2d—2d in FIG. 2(a) and looked at from the front side; and FIG. 2(e) shows the front side of the disk container. Adjacent to the disk space 7, the container body 1 defines a locking space 8 to accommodate a lock plate 10 when the container body 1 is covered by the cover plate 2. A center projection 6 rises upright from the bottom of the container body 1 to fit in the center hole of the disk, and the container body 1 has a slot 9 made on its front side to communicate with the flocking space 8, thereby permitting the lock plate 10 to be inserted in the locking space 8 when the cover plate 2 is closed.

FIGS. 3(a) to 3(f) shows the lock plate 10 as viewed from different angles of view. The lock plate 10 is rectangular, and it comprises a flat plate 11 whose one longitudinal edge 12 has a "U"-shape in its cross-section. Pinching nails 13a and 13b are formed on the reentrant of the flat plate 11, and two "U"-shaped grips 14a and 14b are integrally connected to the front side of the flat plate 11. The longitudinal edge of "U"-shaped cross-section 12 has a lateral extension 15 projecting from the right corner of the flat plate 11. A resilient strip 17 is fixed to the "U"-shaped inside of the longitudinal ledge 12 so that the resilient strip 17 may be bent about its base 16. The resilient strip 17 has a lock nail 18 formed on its top, and is hidden in the "U"-shaped space of the longitudinal edge 12, allowing the lock nail 18 to project from the slit made in the longitudinal wall 19 of the U-shaped beam in its stress-free condition, partly appearing in the locking space. When the resilient strip 17 is made to bend outward, the lock nail 18 is withdrawn from the locking space.

When the lock plate 10 is inserted from the slot 9, the opposite edges of the flat plate 11 are fitted in the gaps 22 and 22 defined between guide pieces 20a and 21a rising upright from the bottom of the container body 1 and counter guide pieces 20b and 21b rising upright from the rear side of the cover plate 2, and at the same time, the opposite extensions 23 and 23 of the longitudinal edge 12 of "U"- shaped cross-section are fitted in the guide grooves 24 and 24 formed in the corresponding longitudinal edges of the container body 1 and cover plate 2. The lock plate 10 is inserted in the locking space until the pinching nails 13a and 13b have been caught by a post 25 rising upright from the bottom of the container body 1. The opposite arms 26 and 26 of each "U"-shaped grip 14a or 14b of the flat plate 11 are fitted in the slits 27 and 27 which are made in the front side of the container body 1.

When the lock plate 10 is inserted in the locking space 8, the cover plate 2 is fastened to the container body 1 with the lock plate 10. In this particular embodiment the lock plate 10 is described as having two lateral extensions 23 and 23 projecting from one longitudinal side, and the container body 1 and cover plate 2 are described as having the guide grooves 24 and 24 to accommodate such lateral extensions 23 and 23. Conversely the lock plate 10 may have female grooves whereas the container body 1 and cover plate 2 may have male projections.

FIGS. 4(a) to 4(d) illustrate how the cover plate 2 is fastened to the container body 1 with the lock plate 10 inserted in the locking space 8. In this position the lock plate 10 cannot be removed because the lock nail 18 is caught by an engagement recess 28 which is made in the container body 1 and projecting into the locking space 8. An unlatching tool has a magnet installed therein. When the unlatching tool is applied to the disk container, the resilient strip 17 is pulled and bent about its base 16 under the influence of magnetic force. Thus, the resilient strip 17 is so inclined that the lock nail 18 may leave the engagement recess. The lock nail 18 may be replaced by a latch pin, which can be inserted in a catch hole made in the cover plate 2 to fasten it to the container body 1. The latch pin can be released from the catch hole by attracting it magnetically, so that the lock plate 10 may be removed from the container body 1.

Figure 5A:
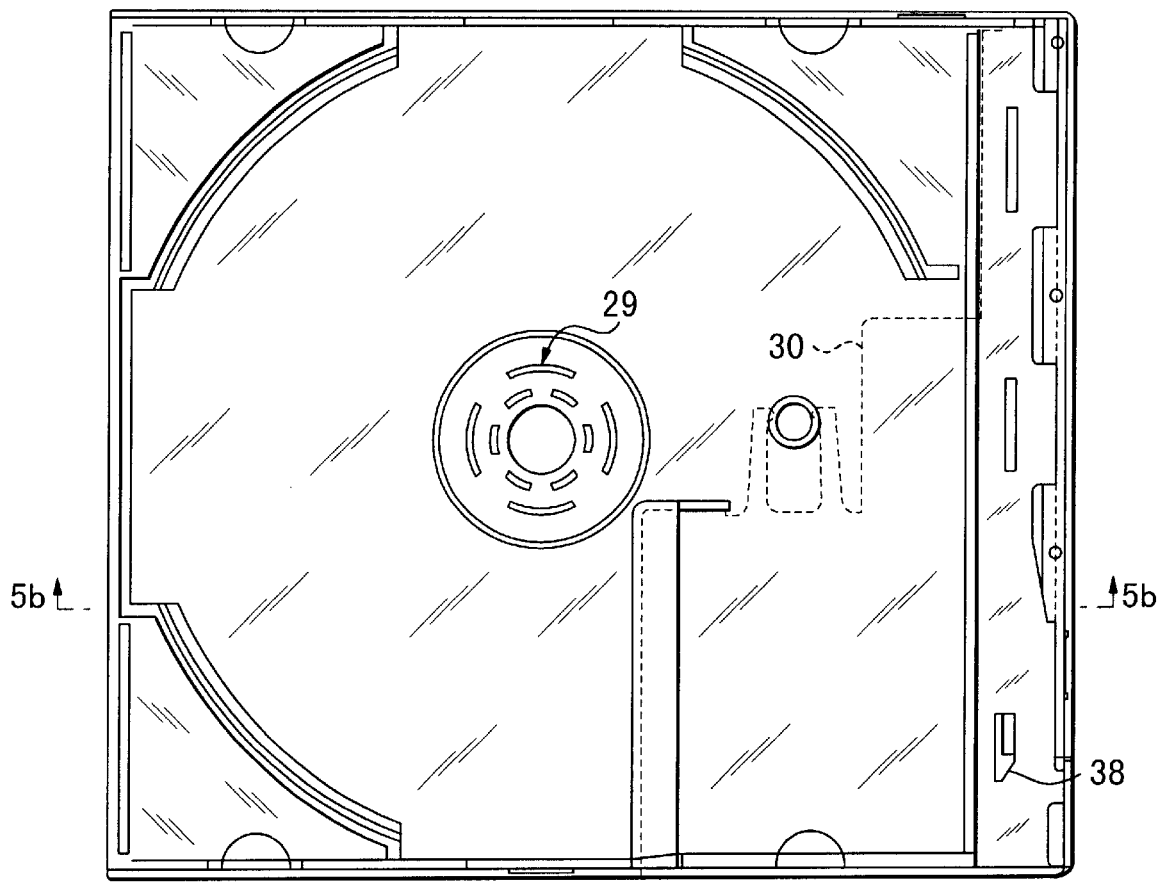
FIGS. 5(a) and (b) are a plane view of a disk container according to another embodiment and a sectional view taken along the line 5b—5b in FIG. (5a) respectively.
Figure 5B:
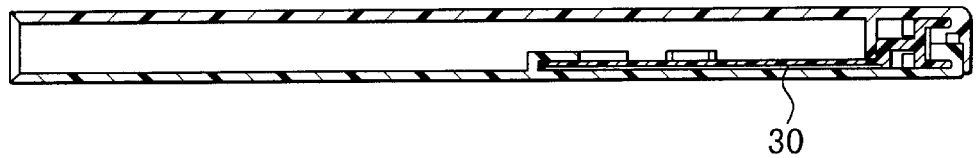

FIGS. 5(a) and 5(b) show a disk container for sale or rent according to another embodiment of the present invention. It is different from the embodiment described above in that the disk space and locking space partly overlaps, and accordingly the disk container is smaller than the one described above. As shown, the container body 1 has a projection 29 at its center, and a lock plate 30 is inserted in the quarter area of the circular disk space (broken line), thereby fastening the cover plate 2 to the container body 1 with the lock plate.

FIGS. 6(a) to 6(d) show the lock plate 30, the shape of which is different from the lock plate 10 of FIG. 3. Specifically the lock plate 30 comprises three rectangular sections each longer and narrower than the one before, and the third, longest and narrowest section 32 has a "U"-shaped cross-section. The longest and narrowest section 32 has a lateral extension 33 projecting outward from one corner of the lock plate 30. A crimping piece 34 is integrally connected to the front side of the first, shortest and widest section 31, extending inward and defining a narrow space between the crimping piece 34 and the first section 31. A pair of pinching nails 35a and 35b are integrally connected to the rear side of the first section 31, protruding forward. A resilient piece 36 has a lock nail 37 formed on its top. The resilient piece 36 is fixed to the beam of the third, longest and narrowest section 32 to be concealed in the "U"-shaped space, allowing the lock nail 37 to appear partly inward from the third, longest and narrowest section 32. The resilient piece 36 can be bent about its base. When the lock plate 30 is inserted in the locking space, the lock nail 37 of the resilient piece 36 is caught by the engagement recess 38 of the container body 1 to prevent the lock plate 30 from falling off from the container body 1, and at the same time, the lock plate 30 fasten the cover plate 2 to the container body 1. Specifically the opposite extensions 39 and 39 of the third section 32 of "U"-shaped cross-section are inserted into the guide grooves, which are made in the container body 1 and the cover plate 2 (see FIG. 5(b)), and the crimping piece 34 is inserted in the catch slot (not shown), which is made in the corresponding side of the cover plate 2. When the lock plate 30 is removed from the disk container, the resilient piece 36 is attracted to the magnet to leave the engagement recess 38, and at the same time, the lateral extension 33 is pulled back.

As is the case with the disk container of FIG. 1, the cover plate 2 may have an extra space defined therein, and it may be equipped with a sub-cover plate 3 to close the extra space.

Figure 7:
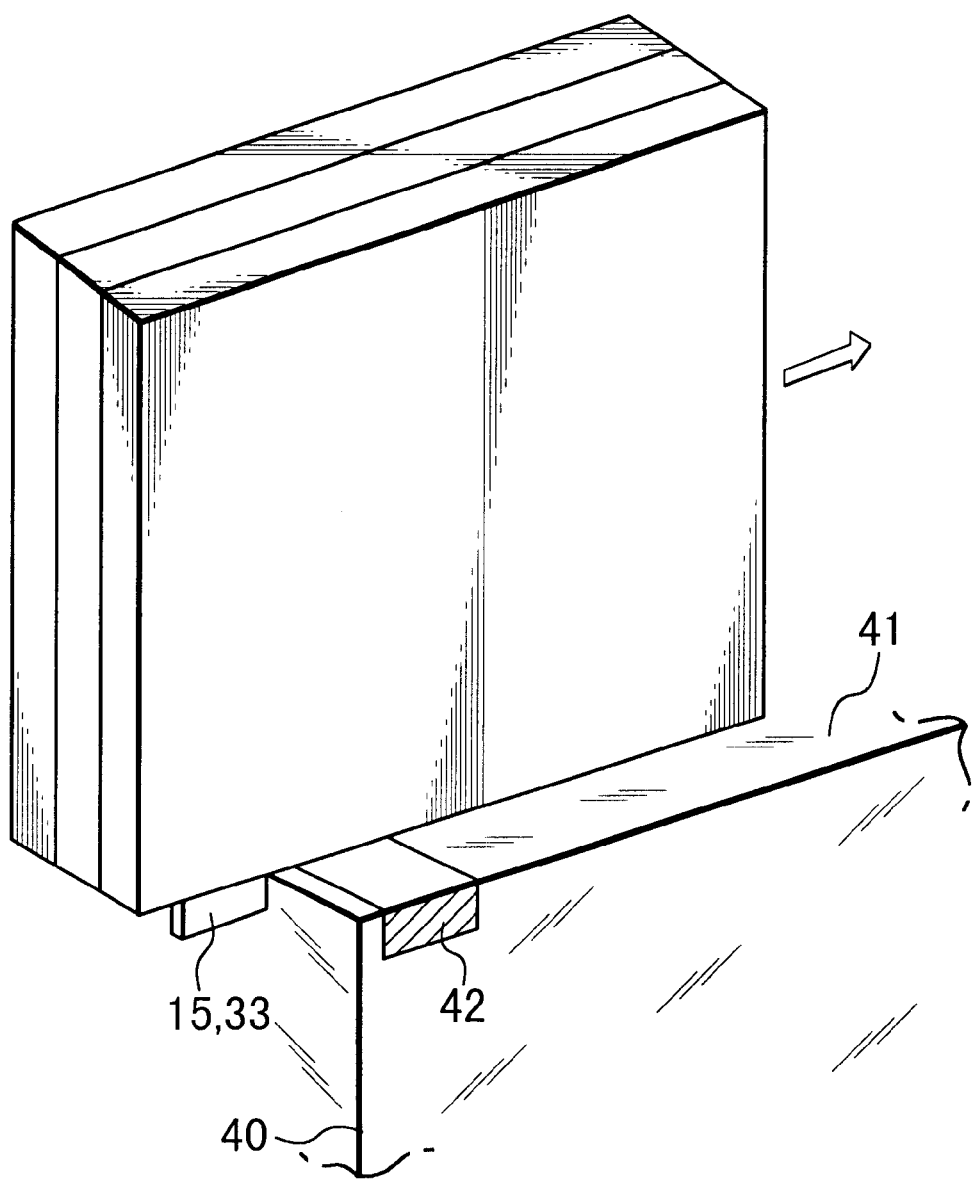
FIG. 7 illustrates how a plurality of disk containers can be unlocked simultaneously.

FIG. 7 shows how a plurality of disk containers can be unlocked simultaneously with an unlocking tool 40. As shown, the disk containers are laid on each other, and the stack of the disk containers are put on the top surface of the unlocking tool 40 with their lateral projections 15 or 33 caught by the corner of the unlocking tool 40. The magnet 42 of the unlocking tool 40 pulls the resilient pieces 17, 36 of these disk containers until their lock nails 18, 37 have left the engagement recesses 28 and 38. Then, the stack of the disk containers are moved in the direction as indicated by arrow to pull the lock plates 10, 30 out of the disk containers. The unlocking tool may take any shape other than the unlocking tool of FIG. 7, provided that it has one corner to catch the lateral projection 15, 33 of each disk container, and that it has a magnet 42 placed so apart from the corner of the unlocking tool that the magnet may be aligned with the lock nail when the disk container is applied to the unlocking tool with its lateral projection caught by the corner.

A customer selects and takes some disk containers out of the shelf to bring them to the counter in the shop, where a clerk unlocks the disk containers to pass unlocked containers to the customer in exchange for money.

An anti-theft disk container according to the present invention provides the following advantages:

The anti-theft disk container containing a disk in its locking condition can be unlocked easily, and a plurality of disk containers each containing a disk in its locking condition can be unlocked simultaneously. This has the effect of expediting the handling of such disk containers in selling or renting CDs, DVDs and other disks in the form of cased articles, not bothering clerks and customers.

What is claimed is:

1. A combination of a disk container provided with antitheft function and an unlocking tool, said disk container comprising: a container body having a disk space defined therein, a cover plate hinged to said container body to open and close the disk space of said container body, and a lock plate; said unlocking tool having a magnet installed therein;

said container body and said cover plate being so constructed that said container body may define a locking space to accommodate said lock plate when said container body is covered by said cover plate, and said container body having a slot made on one side to communicate with said locking space;

said container body and said cover plate being provided with engagement portions in the form of projection or recess, and said lock plate being provided with counter engagement portions in the form of recess or projection, thereby preventing said cover plate from opening by making said engagement portions of said container body and cover plate engage with said counter engagement portions of said lock plate when said cover plate closes said container body with said lock plate inserted in said locking space;

one of said lock plate and, said container body being provided with a stopper to prevent said lock plate from falling off, and the other being provided with a catch to catch said stopper; said stopper being composed of a flat spring whose top end has a lock nail to be caught, by said catch, thereby assuring that said disk container be prevented from opening inadvertently by inserting said lock plate in said locking space until said lock nail of said flat spring is caught by said catch, said lock nail being responsive to application of the magnetic force of said unlocking tool to be pulled apart and released from said catch.

2. A combination of a disk container provided with antitheft function and an unlocking tool according to claim 1, wherein said cover plate is of detachable, openable, slidable, rotary or drawer type.

3. A combination of a disk container provided with antitheft function and an unlocking tool according to claim 2, wherein said cover plate has an extra space formed on its front side for containing pieces of printed matter such as chapter sheets, advertising leaflets, or librettos, said cover plate being provided with a sub-cover plate to close the extra space.

4. A combination of a disk container provided with antitheft function and an unlocking tool according to claim 1, wherein said lock plate has a flat space to attach a tag seal, thereby allowing the attached tag seal to be inserted into the locking space together with the lock plate so that it may not be scratched or removed from outside.

5. A combination of a disk container provided with antitheft function and an unlocking tool according to claim 1, wherein said lock plate has a projection piece integrally connected thereto, the projection piece appearing out of said disk container when said lock plate is inserted in said container body, said unlocking tool having said magnet such a distance apart from a selected corner of said unlocking tool that when said disk container is applied to said unlocking tool with said projection piece caught by said selected corner, said magnet may be aligned with said lock nail to release said lock nail from said catch, thus permitting a plurality of disk containers to be simultaneously unlatched by applying them to said unlocking tool with their projection pieces caught by said selected corner.

6. A combination of a disk container provided with antitheft function and an unlocking tool according to claim 2, wherein said lock plate has a flat space to attach a tag seal, thereby allowing the attached tag seal to be inserted into the locking space together with the lock plate so that it may not be scratched or removed from outside.

7. A combination of a disk container provided with antitheft function and an unlocking tool according to claim 3, wherein said lock plate has a flat space to attach a tag seal, thereby allowing the attached tag seal to be inserted into the locking space together with the lock plate so that it may not be scratched or removed from outside.

* * * * *